(12) United States Patent
Look

(10) Patent No.: US 11,966,732 B2
(45) Date of Patent: Apr. 23, 2024

(54) DATA STRUCTURES FOR MANAGING CONFIGURATION VERSIONS OF CLOUD-BASED APPLICATIONS

(71) Applicant: AMPERITY, INC., Seattle, WA (US)

(72) Inventor: Gregory Kyle Look, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 164 days.

(21) Appl. No.: 17/373,976

(22) Filed: Jul. 13, 2021

(65) Prior Publication Data

US 2021/0382711 A1 Dec. 9, 2021

Related U.S. Application Data

(63) Continuation of application No. 16/896,844, filed on Jun. 9, 2020, now Pat. No. 11,080,043.

(51) Int. Cl.
*G06F 8/71* (2018.01)
*G06F 21/53* (2013.01)

(52) U.S. Cl.
CPC .............. *G06F 8/71* (2013.01); *G06F 21/53* (2013.01)

(58) Field of Classification Search
CPC .................................. G06F 8/71; G06F 21/53
See application file for complete search history.

(56) References Cited

U.S. PATENT DOCUMENTS

| | | | | |
|---|---|---|---|---|
| 7,480,896 B2* | 1/2009 | Harry | ...... | G06F 8/71 717/121 |
| 8,010,487 B2* | 8/2011 | Richardson | ...... | G06F 16/1834 709/227 |
| 8,140,624 B2* | 3/2012 | Gingell | ...... | G06F 8/63 709/201 |
| 8,620,959 B1* | 12/2013 | Denton, III | ...... | G06F 16/25 703/3 |
| 9,471,304 B1* | 10/2016 | Fuchs | ...... | G06F 8/71 |
| 10,341,183 B2* | 7/2019 | Annamaneni | ...... | G06F 9/44505 |
| 10,686,911 B2* | 6/2020 | Lee | ...... | H04L 67/34 |
| 11,016,756 B1* | 5/2021 | Moore | ...... | G06F 16/23 |
| 2002/0144255 A1* | 10/2002 | Anderson | ...... | G06F 8/71 717/174 |
| 2008/0127045 A1* | 5/2008 | Pratt | ...... | G06F 9/454 704/8 |
| 2010/0088676 A1* | 4/2010 | Yuan | ...... | G06F 16/80 707/E17.005 |
| 2010/0169865 A1* | 7/2010 | Clemm | ...... | G06F 8/71 717/121 |
| 2011/0173607 A1* | 7/2011 | Murphey | ...... | G06F 16/188 718/1 |
| 2015/0249723 A1* | 9/2015 | Srinivas | ...... | H04L 67/10 715/745 |
| 2016/0308955 A1* | 10/2016 | Dingsor | ...... | G06F 9/46 |
| 2017/0147527 A1* | 5/2017 | Chandrasekaran | ..... | H04L 67/10 |

(Continued)

*Primary Examiner* — Douglas M Slachta
(74) *Attorney, Agent, or Firm* — George David Zalepa; Greenberg Traurig, LLP

(57) ABSTRACT

The present disclosure relates to methods and systems for applying version control of configurations to a software application, such as, a cloud-based application. Each version may be stored as a plurality of configuration nodes within a configuration tree structure. Version changes may lead to the creation or modification of configuration nodes. Configurations may be tested in a sandbox and undergo validation checks before being applied to the software application.

20 Claims, 10 Drawing Sheets

(56) References Cited

U.S. PATENT DOCUMENTS

| | | | |
|---|---|---|---|
| 2017/0351511 A1* | 12/2017 | Bar-Or | G06F 8/34 |
| 2018/0278725 A1* | 9/2018 | Thayer | G06F 16/252 |
| 2018/0365005 A1* | 12/2018 | Gu | G06F 8/71 |
| 2019/0026697 A1* | 1/2019 | Burton | G06F 8/71 |

* cited by examiner

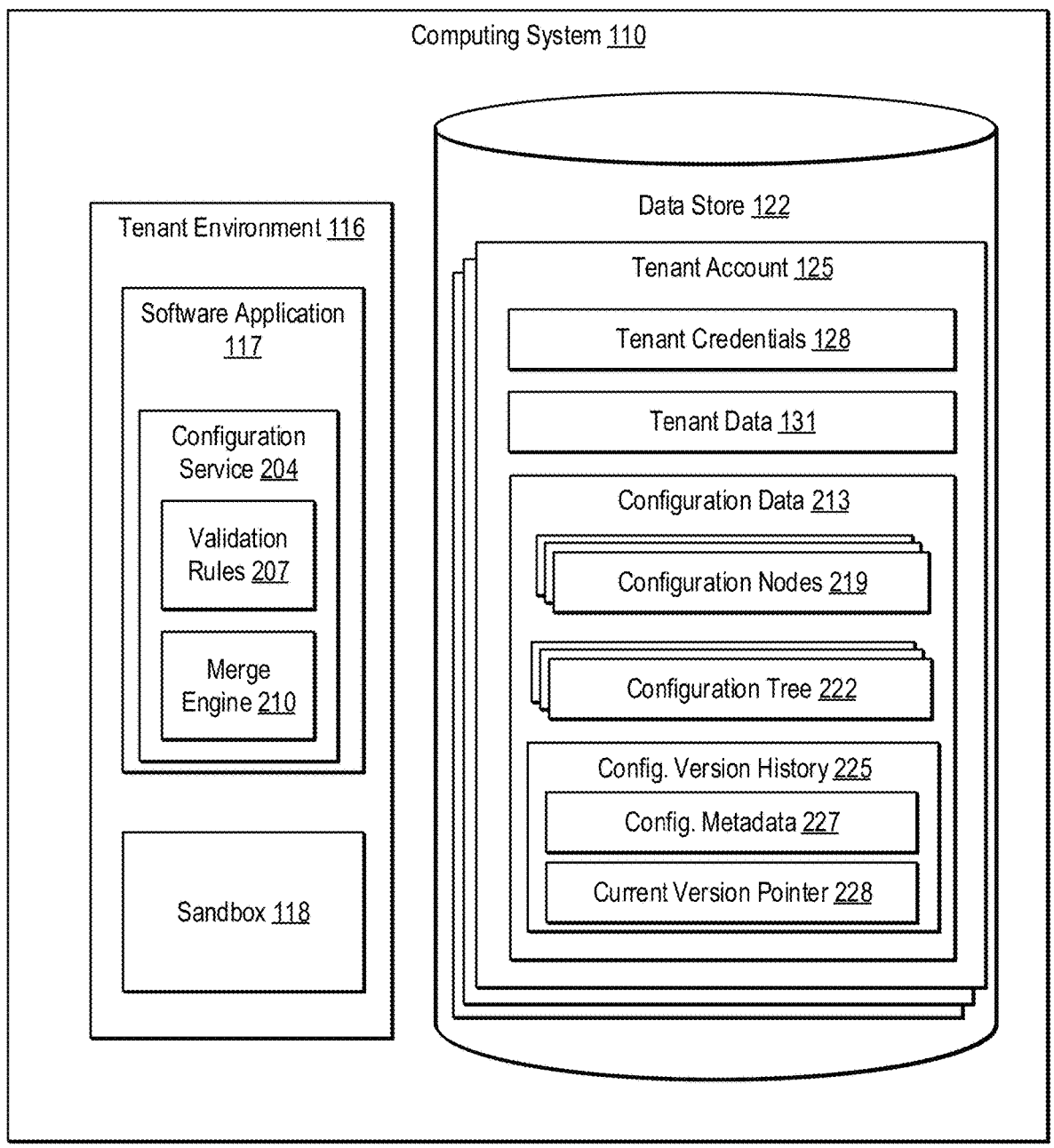
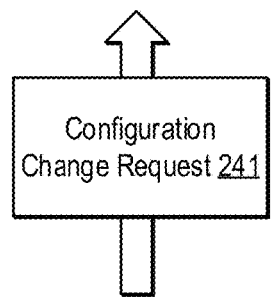
FIG. 2

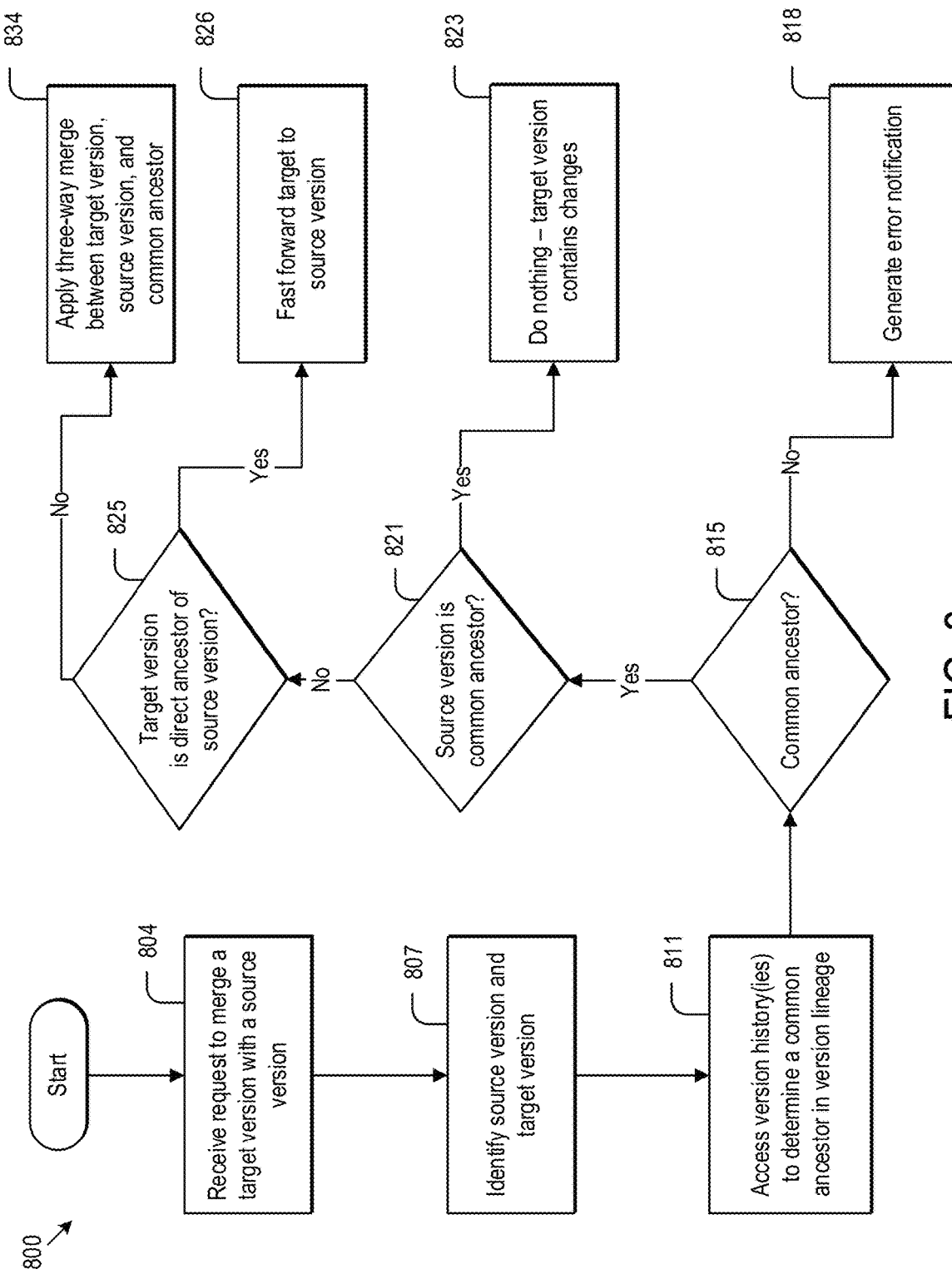

DATA STRUCTURES FOR MANAGING CONFIGURATION VERSIONS OF CLOUD-BASED APPLICATIONS

CROSS-REFERENCE TO RELATED APPLICATIONS

The present application is a continuation and claims priority to U.S. application Ser. No. 16/896,844, filed on Jun. 9, 2020, and incorporated herein by reference in its entirety.

BACKGROUND

In cloud-based software applications, a server or cluster of servers provide software tools to a variety of user groups, where each user group may individually configure the cloud-based software application. As a user group continues to integrate a cloud-based software application into its business practices or Information Technology (IT) infrastructure, a user group may change and adjust the configurations of the cloud-based software application. Different users within a user group may have access privileges to make changes to the configuration settings of the cloud-based software application. To track and manage configurations, users within a user group should communicate with one another when implementing configurations to avoid conflicting efforts.

In addition, when implementing new configurations, users may experiment with configurations before committing to them. For example, users may implement configurations in an isolated environment, referred to as a sandbox. A user may manually troubleshoot, test, or validate configurations within a sandbox. If the configurations are satisfactory, the user may then manually replicate these configurations and apply them to the cloud-based software application. There are several drawbacks and disadvantages to prior approaches. The present disclosure addresses these drawbacks and disadvantages.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 2 is a drawing of a computing environment, according to various embodiments of the present disclosure.

FIG. 8 is a flowchart illustrating an example of the functionality of a configuration service executed in the computing environment of FIG. 2 to implement configuration merging, according to various embodiments of the present disclosure.

DETAILED DESCRIPTION

Various embodiments of the present disclosure relate to storing configurations of a cloud-based application in a way that permits version control of different configurations. For example, configurations are stored as nodes within a tree. New configuration versions may create new nodes and/or new trees. Version metadata is recorded to track version lineage in a version history.

Other aspects of the present disclosure relate to merging configuration versions together. For example, users may create new configurations in a sandbox and then merge those configurations into the production instance of a cloud-based application. Embodiments address complicated scenarios where multiple configurations are generated by different users at the same time may be merged in a manner that minimizes or otherwise addresses conflicts in the configurations.

End users may benefit from the embodiments discussed herein in various ways. For example, end users may experiment with new configurations and easily apply them to the production instance of a cloud-based application. This approach may save significant amounts of time over traditional solutions of manually inputting configuration changes in the production instance of a cloud-based application after testing them in a sandbox environment. Moreover, if the configurations have changed in the production instance of a cloud-based application, configurations made in the sandbox environment may be merged as the production instance of a cloud-based application undergoes configuration modification. In addition, embodiments allow for the tracking and management of previous configurations in the event there is a need to revert to a previous version. While the foregoing provides a high-level summary, the details of the various embodiments may be understood with respect to the Figures.

Figure 1:
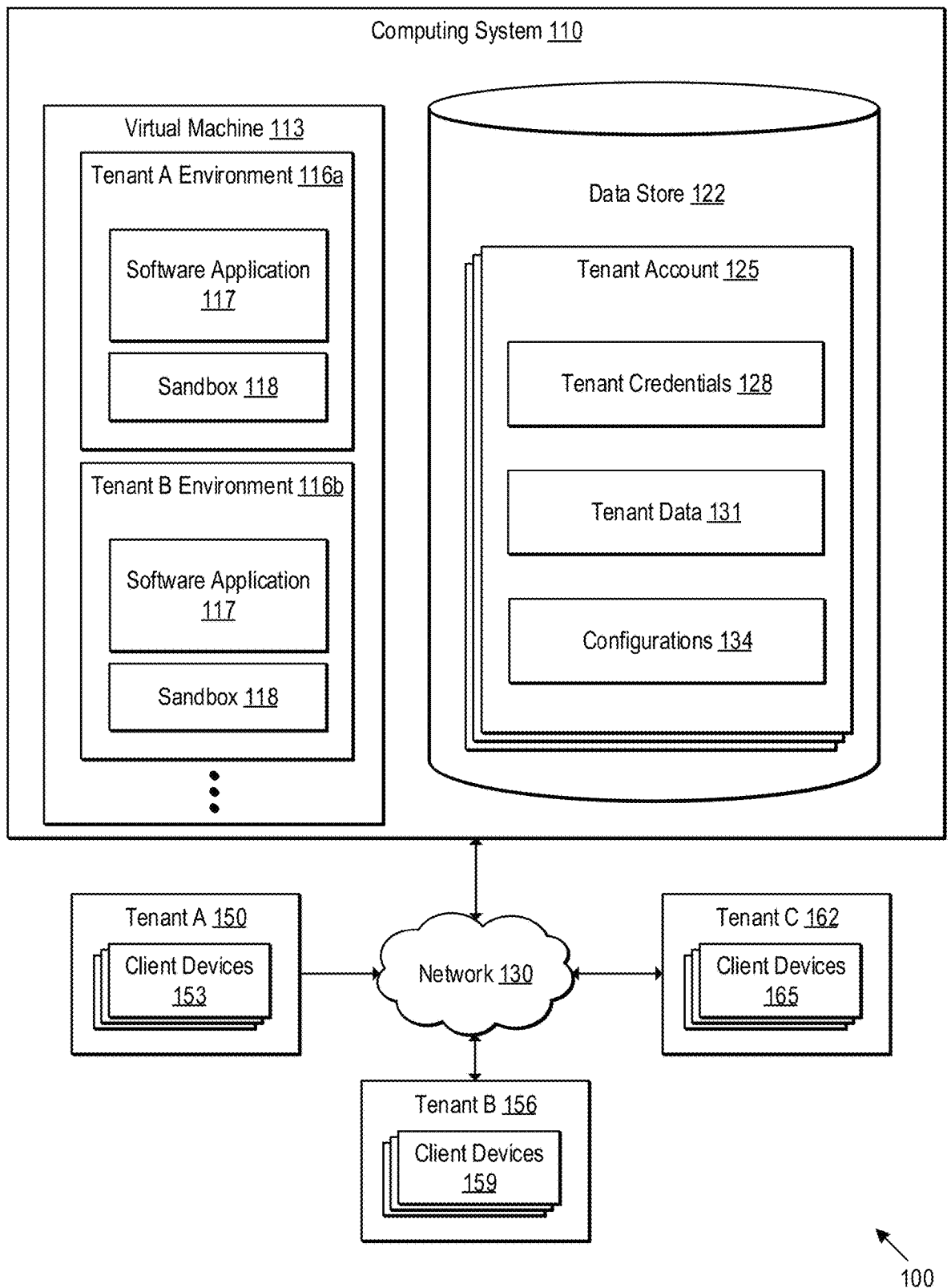
FIG. 1 is a drawing of a computing environment that lacks version management of configurations.

FIG. 1 is a drawing of a computing environment that lacks version management of configurations. The computing environment 100 includes a computing system 110 that is made up of a combination of hardware and software. The computing system 110. The computing system 110 may comprise, for example, a server computer or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations.

For example, the computing system 110 may include a plurality of computing devices that together may comprise a hosted computing resource, a grid computing resource and/or any other distributed computing arrangement. In some cases, the computing system 110 may correspond to an elastic computing resource where the allotted capacity of processing, network, storage, or other computing-related resources may vary over time. The computing system.

The computing system 110 may implement a virtual machine 113 that use the resources of the computing system 110. The virtual machine 113 may represent one or more virtual machines. The virtual machine 113 may support an operating system and other applications or programs executing on the operating system. In turn, the virtual machine provides access to memory and computing resources of the physical computing system 110. The virtual machine 113 may be configured to provide a multi-tenant cloud solution. For example, the virtual machine 113 is arranged in separate environments for different tenants that share a cloud-based application. A tenant may refer to a customer or entity that uses the services of the cloud-based application. A single tenant may include several users. The virtual machine 113 may include an environment for Tenant A (Tenant A Environment 116a), an environment for Tenant B (Tenant B Environment 116b), etc. Software application 117 may execute in each tenant environment 116a, 116b.

The software application 117 may be a cloud-based application. The software application 117 may include a plurality of software programs, modules, or routines. The software application 117 may represent a cloud-based platform that is offered as software as a service (SaaS). When executing in the computing system 110, the software application 117 may be an instance of production code. And when implemented in a multi-tenant system, the software application 117 is shared among separate tenants (e.g., Tenant A, Tenant B, etc.). However, each data and configurations of the software application 117 are not shared between tenants and are instead isolated to each respective tenant environment 116a, 116b. Tenant environments 116a, 116b are implemented by logically walling off portions of the software application 117 to allow different tenants to share the software application 117.

Within each tenant environment 116a, 116b, the software application 117 may be cloned and executed within a sandbox 118. A sandbox 118 may be a software environment that executes a child copy (e.g., sandbox instance) of the software application 117. In this respect, the sandbox 118 may be created to execute a sandbox instance of the software application 117 in parallel with the software application 117. According to embodiments, there may be multiple, parallel sandbox instances. While the software application 117 may be considered a production-level solution to fulfill the needs of the tenant, the sandbox instance in the sandbox 118 allows users to experiment, manipulate, or otherwise use the functionality provided by the software application 117 without affecting or interfering with its operation. Multiple sandbox instances may be created to allow a team of developers to concurrently develop new configurations.

The computing system 110 also includes a data store 122. The data store 122 may represent one or more data stores for storing data. The data store 122 may include a database, a file system, or other systems for storing data. The data store 122 may store one or more tenant accounts 125. A tenant account 125 may include all data relating to a particular tenant. Moreover, each tenant account 125 may be separated from other tenant accounts to ensure that data that is sensitive to one tenant is not shared with other tenants. A tenant account 125 may include tenant credentials 128, tenant data 131, and configurations 134. Tenant credentials 128 may include login information, usernames, passwords, or other security mechanisms to authenticate and authorize a particular tenant to access a tenant's software application 117 and any data associated with the tenant's software application 117. Tenant credentials 128 are used to separate tenants to maintain secure access. In addition, tenant credentials may track each user associated with a particular tenant and/or each user device associated with a particular tenant. Tenant data 131 may include substantive data owned by a tenant. This may include database records, binary large objects (blobs), multimedia files (e.g., audio, video, image), documents, or any other information that the tenant wishes to process or analyze.

Configurations 134 include data that specify configurations for a tenant's software application 117. Configurations 134 may define user permissions, access controls, data asset management, attributes of software components, etc. The software application 117 is designed to be configured in various ways, and therefore, the types of configurations are dependent on the design of the software application being configured. Some additional examples of configurations include identifying sources of data to integrate or process (e.g., the location of a server, the name of a cloud storage bucket), the shapes of data in the system (e.g., data structures that describe a database with named tables, each of which have some columns with names and types), saved database search queries to run against those tables in order to generate some results, a scale of resources to run jobs with, where some tenants need much larger compute clusters than others.

The computing system 110 may be connected to a network 130 such as the Internet, intranets, extranets, wide area networks (WANs), local area networks (LANs), wired networks, wireless networks, or other suitable networks, etc., or any combination of two or more such networks. Various tenants may be connected to the network 130 to receive the services provided by the software application 117. For example, Tenant A 150, Tenant B 156, and Tenant C 162 may each be tenants that use the software application 117 simultaneously. A tenant 150, 156, 162 may be a logical organization of users using respective client devices 153, 159, 165. A client device 153, 159, 165 allows a user to interact with the components of the computing system 110 over the network 130. A client device 153, 159, 165 may be, for example, a cell phone, laptop, personal computer, mobile device, or any other computing device used by a user. The client device 153, 159, 165 may include an application such as a web browser or mobile application that communicates with the software application 117 to access, manipulate, edit, or otherwise process tenant data 131. The software application 117 sends and receives information to and from the client device 153, 159, 165. For example, client devices 153 of Tenant A 150 may use the software application 117 only within the Tenant A environment 116a. The multi-tenant architecture separates each tenant account 125 so that, for example, client devices 153 of Tenant A 150 use tenant credentials 128, tenant data 131, and configurations 134 limited to Tenant A 150.

Next, a general description of the operation of the various components of the computing system 110 is provided. A software developer develops the software application and executes an instance of a software application 117 within a virtual machine 113. The software developer may separate the execution of the software application 117 into various tenant environments 116a, 116b. Each tenant environment 116a, 116b may be walled off or logically separated from one another so that each tenant 150, 156, 162 shares the software application 117 but without comingling their own data and/or configurations.

Tenant A 150 may use the software application 117 to process, analyze, or manipulate tenant data 131 that is specific to Tenant A 150. Tenant A may configure the software application 117 by applying configurations 134. These configurations are applied to the Tenant A environment 116a without being applied to other tenant environments 116b. Tenant A 150 may also launch a sandbox instance within a sandbox 118 where the sandbox instance is cloned from the software application 117 of the Tenant A environment 116a. In this respect, the sandbox instance may be identical to the software application however, configurations 134 are not saved and applied. The term "production" or "production level" refers to the software application 117 used by the tenant in the normal course of business while "sandbox" refers to a cloned version of the production-level software application 117 where changes made in the sandbox do not affect the production-level software application 117 of a particular tenant.

Problems may arise when different users (via respective client devices 153, 159, 165) simultaneously make changes to the configurations 134. In addition, changes made in the sandbox instance to test our configurations may need to be manually tracked and implemented to the production-level software application 117.

FIG. 2 is a drawing of a computing environment 200, according to various embodiments of the present disclosure. FIG. 2 improves upon the computing environment 100 of FIG. 1 by modifying the way configurations are structured, stored, and applied. FIG. 2 depicts a tenant environment 116, which is set for a specific tenant. A software application 117 executes within the tenant environment 116. The software application 117 may include several modules including, for example, a configuration service 204. The configuration service 204 provides various functionality and benefits described in further detail below according to various embodiments. At a high level, the configuration service provides configuration version control and the ability to merge different versions. The configuration service 204 may include, for example, validation rules 207 and a merge engine 210. Validation rules 207 may be applied to evaluate whether a configuration version has any issues, problems, errors, or conflicts. The merge engine 210 allows two configuration versions to be combined into a merged configuration version. They may be useful when configuration version developed within a sandbox 118 are merged with any configurations made in the production-level software application 117.

Like the example in FIG. 1, access and control over each tenant account is managed through tenant credentials 128, and each tenant owns and manages their own tenant data 131. However, unlike the example of FIG. 1, the computing environment 200 of FIG. 2 includes configuration data 213 that accommodates a variety of functionality such as, for example, configuration versioning, version tracking, version merging, and automatic version validation. Examples of data structures that make up the configuration data 213 is discussed below.

The configuration data 213 may be organized as configuration nodes 219 and configuration trees 222. One or more configuration nodes 219 may be stored in a configuration node file. A configuration node file may be a JavaScript Object Notation (JSON) file or other file formats that characterize a data object's attribute-value pairs, array data types, or other formats for serializing data that represents a data object. For example, a configuration node file may identify a set of configuration nodes 219. A single configuration node 219 embodies a particular configuration for the software application 117. A configuration node 219 represents a logically distinct unit of configuration, which may apply to an identifiable entity in the application. For example, different user segment queries may each be represented by a distinct configuration node 219. The configuration nodes 219, according to some embodiments, allow for configuration values that are shared between versions and between sandboxes/parents if configuration values are unchanged.

Each configuration tree 222 may be stored as a configuration tree file and may be formatted as JSON file or other similar file. A configuration tree 222 references different configuration nodes 219. For example, a configuration tree 222 identifies configuration nodes 219 by a configuration node identifier and further species a path for each configuration node 219. In this respect, the configuration tree 222 structures the relationships and connections among different configuration nodes 219 to form a hierarchical configuration node structure. For example, configuration nodes 219 may contain legal data types and have complex nested structures. Configuration nodes 219 are not limited to simple key-value entries and may contain complex nested data structures.

There may be several advantages of structuring configurations as configuration nodes 219 within a configuration tree 222. For example, this structure may be useful for querying. To illustrate, a configuration for Database A may be located at the address "database/databases/A" while the tables for Database A, Table X and Table Y, may be located at the addresses "database/databases/A/tables/X" and "database/databases/A/tables/Y", respectively. Finding all the tables for Database A can be done by listing everything under the address "database/databases/A/tables/." In addition, this structure carries over to authorization controls. The hierarchical structure permits users to specify user permissions by allowing or denying changes to paths with certain prefixes. For example, a user may be allowed to modify all database settings (database/*) or just the configuration for Database A (database/databases/A/*), etc. Another example of a hierarchical relationship in the configuration tree 222 is when the child nodes are more-specific versions of a particular configuration. For example, there may be configurations for particular functions (e.g., jobs) of an analytics engine. A generic resource configuration for the functions/jobs is in the top-level node " . . . /engine/", while database-specific settings are in " . . . /engine/databases/.

The configuration data 213 may also include a configuration version history 225. The configuration version history 225 may be a log file that organizes various configurations into configuration versions. A configuration version may be a data structure the references a particular configuration tree 222. In addition, the configuration version may include metadata 227 that provides information about a particular configuration version. A configuration version may also include an identifier to a parent configuration version. This allows the lineage of each configuration version to be tracked within the configuration version history 225. The configuration version history may include a current version pointer 228. The current version pointer 228 identifies a single configuration version as the current configuration version. The software application 117 is configured according to the configuration version that is set to the current configuration version. When the current version pointer 228 is updated to refer to a new configuration version, the software application 117 loads the new configuration version.

In some embodiments, the computing environment 200 allows for tenants to create configurations in a sandbox 118 while the software application 117 executes on a production-level. A sandbox instance within the sandbox 118 is created by cloning the software application 117. In addition, a configuration version history 225 for the sandbox instance may be generated to track configuration versions made within the sandbox 118. Thus, in this embodiment, there may be two configuration version histories 225: one for the production-level software application 117 and one for the sandbox instance. Each configuration version history 225 may be stored as a respective file. This allows a tenant to continue to operate on tenant data 131 according to a current configuration version while developers may experiment with new configurations within the sandbox 118 without affecting the operation of the software application 117 outside of the sandbox 118. In addition, the configurations to both the software application 117 and the sandbox instance are updatable, as different users of a tenant may continuously or occasionally generate new configurations at any point in time. As discussed below, configuration versions may be merged to accommodate the dynamic creation of new configurations.

In addition, a user associated with a particular tenant may submit a configuration change request 241. For example, a user may log into a portal or otherwise access the software application 117 using tenant credentials. Alternatively, developers of the software application 117 may submit the configuration change request 241 on behalf of a tenant. The configuration change request 241 is handled within the relevant tenant environment 116. The configuration service 204 may process the configuration change request 241 to change a configuration node 219, add a new configuration node 219, or change the configuration tree 222. A configuration change request 241 results in the creation of a new configuration version that is recorded in the configuration version history 225.

Figure 3:
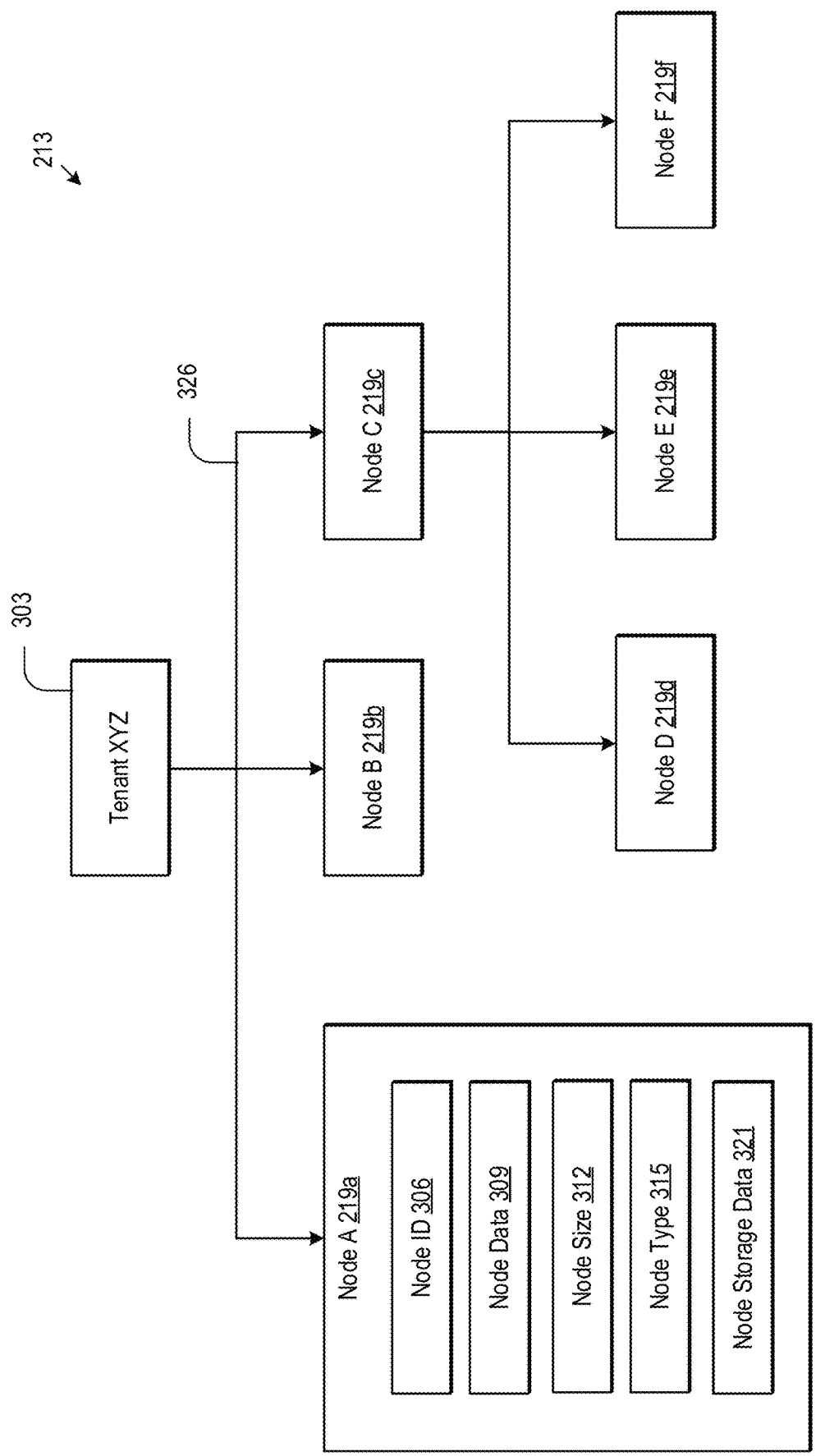
FIG. 3 is visual representation of data structures that embody configuration data in the computing environment of FIG. 2, according to various embodiments of the present disclosure.

FIG. 3 is visual representation of data structures that embody configuration data 213 in the computing environment 200 of FIG. 2, according to various embodiments of the present disclosure. The configuration data 213 is specific to a particular tenant 303 having its own tenant account 125. In some embodiments, all configurations made with respect to the tenant 303 applies only to the tenant 303 and to no other tenant. FIG. 3 also represents one configuration version. Other configuration versions may be stored within the tenant account 125. In addition, other configuration versions may be generated within the sandbox 118 without affecting the configuration data 213 shown in FIG. 3. Each configuration node 219 represents a portion of the overall configuration of the software application 117 or a subsystem of the software application 117.

The configuration data 213 may include a plurality of configuration nodes 219a-f. The example of FIG. 3 shows several configuration nodes 219a-f for corresponding configuration nodes, Nodes A-F, respectively. Each configuration node 219 may include attributes such as, for example, a node identifier (ID) 306, a node path 309, a node size 312, a node type 315, and/or node storage data 321. In addition, the configuration node 219 includes or references specific configurations for how to configure the software application 117. The node ID 306 may be an alphanumeric identifier used to differentiate different nodes and to select or reference a specific configuration node 219.

The node data 309 includes the specific configurations of the configuration node 219. In this respect, the node data forms the substantive content of the node The node size 312 specifies the size (e.g., in terms of bits) of the node. When the configuration node is serialized into memory, the node size 312 may be used to assist in the storage of the configuration node 219 in the data store 122.

The node type 315 may be assigned by users of the tenant 303 to catalog and manage configuration nodes 219. The node type 315 may include one or more keywords to allow users to query nodes for easily searching for configuration nodes.

The node storage data 321 includes any other information used to help store the configuration node 219 in the data store.

FIG. 3 also shows a visual representation of configuration nodes 219a-f arranged in a tree hierarchy. The hierarchy is established by the configuration tree 222. The configuration tree 222 defines paths 326 that organizes the configuration nodes within the tree structure. For example, Node C 219c is the parent configuration node to Node D 219d, Node E 219e, and Node F 219f. In this respect the configurations defined by Node D 219d, Node E 219e, and Node F 219f may further specify configurations defined by Node C 219c.

The data represented in FIG. 3 may be stored as one or more configuration node files and a configuration tree file, where the configuration node file(s) includes Nodes A-F 219a-f and where the configuration tree file defines the paths 326 that connect Nodes A-F 219a-f. In addition, the configuration tree file may reference the node IDs 306 of each of the Nodes A-F 219a-f. The configuration node paths are defined by the configuration tree file that organizes various configuration nodes in a hierarchy. A particular configuration node 219 may appear more than once at different paths within a configuration tree 222, as defined by the configuration file.

Figure 4:
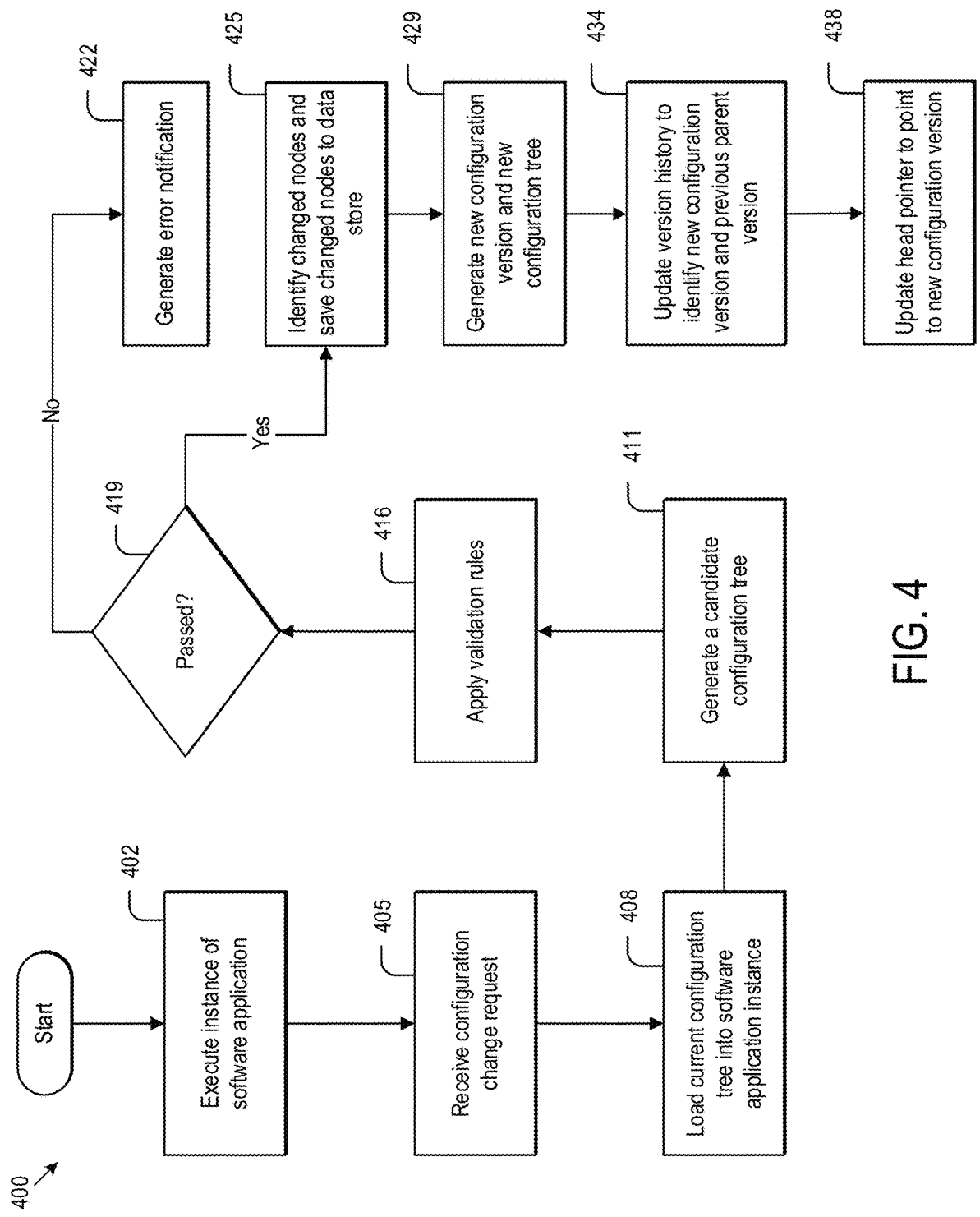
FIG. 4 is a flowchart illustrating an example of the functionality of a configuration service executed in the computing environment of FIG. 2 to implement configuration versioning, according to various embodiments of the present disclosure.

FIG. 4 is a flowchart illustrating an example of the functionality of a configuration service executed in the computing environment of FIG. 2 to implement configuration versioning, according to various embodiments of the present disclosure. It is understood that the flowchart of FIG. 4 provides merely an example of the many different types of functional arrangements that may be employed to implement the operation of the portion of the software application as described herein. As an alternative, the flowchart of FIG. 4 may be viewed as depicting an example of elements of a method 400 implemented in the computing system 110 of FIG. 2, according to one or more embodiments.

At item 402, the computing system 110 executes the software application 117 as an instance. The software application 117 may be instantiated within a multi-tenant environment where different tenants share an instance of the software application 117. In this respect, a first portion of the software application allocated to a first tenant may be referred to as the "first tenant instance", a second portion of the software application allocated to a second tenant may be referred to as the "second tenant instance", etc. The software application 117 may be instantiated within a virtual machine 113. An instance of the software application 117 may also be executed in a sandbox, such that it is a sandbox instance. In this embodiment, the sandbox instance is created by cloning the portion of the software application for a particular tenant. Thus, item 402 refers to executing the software application 117 as an instance, where a portion is allocated to a particular tenant and/or cloning the tenant instance of the software application 117 in a sandbox for the particular tenant.

At item 405, the computing system 110 receives a configuration change request 241. For example, the configuration change request 241 may be to add a new database that stores additional tenant data 131, change the path or name of the database that stores tenant data 131, add a database query for accessing tenant data 131, apply particular settings or select specific options of the software application 117, etc. The configuration change request 241 may be sent by a client device of a user associated with a tenant. The configuration change request 241 may include a tenant identify that specifies a particular tenant.

At item 408, the computing environment 100 loads a current configuration tree into the software application instance. For example, if the software application instance is executed as a sandbox instance in the sandbox, the current configuration tree is loaded. The current configuration tree may be specified by the current version pointer 228 in the configuration version history 225. The software application instance may read a pointer that points to the current configuration version, where the current configuration version identifies a particular configuration tree 222. The configuration tree 222 references various configuration nodes 219 and defines their hierarchical structure. By loading the current configuration version (and its referenced configuration tree 222), the computing system 110 can determine what aspects of the current configuration version is being changed by the configuration change request 241 and which aspects remain the same.

At item 411, the computing system 110 generates a candidate configuration tree. The candidate configuration tree may be generated without storing it in the data store or otherwise committing it to storage. The computing system may identify the changes between the configuration changes in the configuration change request 241 and the current configuration version. For example, a change may be identified in the configuration change request with respect to the current configuration tree. Some examples of changes may be a change to a referenced database, a change to a database query, a change to specific settings, etc. As a result, the candidate configuration tree may reference at least some configuration nodes 219 stored in the data store that are preexisting prior to the change. In addition, new configuration nodes 219 may be generated in response to processing the configuration change request 241. The new configuration nodes may be new with respect to the configuration nodes 219 that are previously stored in the data store 122. In other cases, preexisting configuration nodes 219 may be updated in response to processing the configuration change request 241. For example, a configuration node that passes specific parameters in a database query may have its parameters modified according to the configuration change request 241. This leads to an updated configuration node instead of a newly generated configuration node.

At item 416, the computing system 110 applies one or more validation rules 416 to the candidate configuration tree. Validation rules may implement a validation check to determine whether a particular configuration tree (e.g., a candidate configuration tree) contains any errors. For example, a current configuration version includes a configuration node 219 that identifies a particular database and a different configuration node 219 that performs a database query on the particular database. If the configuration change request 241 may include a request to remove the database. In this example, a validation error may occur because removing the database will cause the database query to refer to a database that is removed.

At item 419, if the candidate configuration tree violates one or more validation rules, then, at item 422, the computing system 110 generates an error notification. The error notification may identify the validation rule that was violated. The error notification may identify one or more configuration nodes that were subject to the error. The error notification may be transmitted to the client device that submitted the configuration change request 241. This may inform users of potential issues with configurations.

If the candidate configuration tree satisfies the validation rules, then, at item 425, the computing system 110 may identify any changed configuration nodes and save the changed configuration nodes in the data store 122. For example, if the configuration change request 241 leads to the creation of a new configuration node that is not already in the data store 122, that new configuration node is saved and committed to storage. However, if the configuration change request 241 involves updating or adding a configuration node 219 that was previously stored in the data store (e.g., as part of a different configuration version), then there are no new changed configuration nodes to store.

At item 429, the computing system 110 generates a new configuration version and new configuration tree. In this respect, the computing system 110 stores the candidate configuration tree in the data store 122 after confirming that it passes the validation rules. The candidate configuration tree may then be referred to as a new configuration tree 222 that is accessible in the data store 122 as it is stored with other configuration trees 222. The new configuration tree 222 represents a new configuration version.

At item 434, the computing system 110 updates the configuration version history 225 to identify new configuration version and the previous parent configuration version. For example, the configuration change request 241 is made to a sandbox instance, then the configuration version history 225 for the sandbox instance is updated to include the new configuration version, where the new configuration version references the new configuration tree 222. In addition, the new configuration version may also reference the parent configuration version, which, in this example, was the current configuration tree at item 408.

At item 438, the computing system 110 updates a head pointer to point to the new configuration version. The head pointer may allow the software application 117 to identify the current configuration version as specified in the configuration version history 225. There are at least two scenarios that can take place with respect to item 438. In a first scenario, if the software application instance is the production-level application for a particular tenant, the configuration version history 225 is updated to set the new configuration version as the current configuration version. In a second scenario, the software application instance is a sandbox instance and the configuration version history 225 is a specific to the sandbox instance. In this scenario, the new configuration version (which is implemented in the sandbox) and can be merged with a configuration version associated with the production-level instance. In this respect, the current configuration version may be updated for the production-level instance by merging configurations made in the sandbox instance to a configuration associated with a production-level instance.

Once the configuration is updated to a new current configuration version, the software application 117 may process tenant data 131 according to the new current configuration version. Thus, FIG. 4 shows how configuration change requests can be made in either a sandbox instance or to production-level instance of the software application 117.

Ultimately, this will allow the portion of the software application 117 that is allocated to a particular tenant to be reconfigured. Then the reconfigured software application 117 may continue processing tenant data 131.

Figure 5:
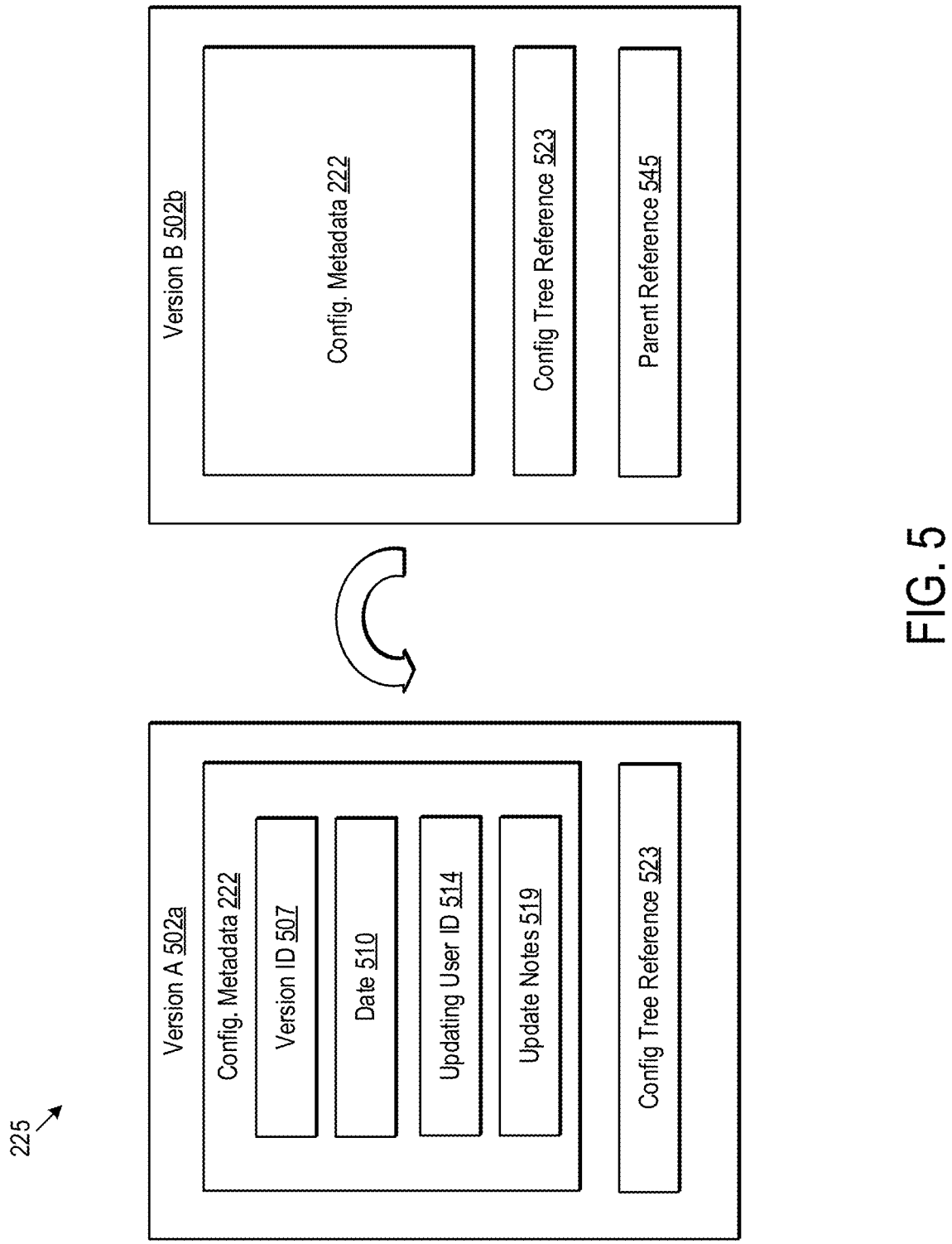
FIG. 5 is visual representation of data structures that embody a configuration version history in the computing environment of FIG. 2, according to various embodiments of the present disclosure.

FIG. 5 is visual representation of data structures that embody a configuration version history 225 in the computing environment of FIG. 2, according to various embodiments of the present disclosure. The configuration version history 225, as shown in FIG. 5 may represent a configuration version history 225 of a production-level instance of the software application 117 or configuration version history 225 of a sandbox instance of the software application 117. The configuration version history 225 may be a formatted as file. It may contain data objects, each of which correspond to a different configuration version. As shown in the example of FIG. 5, the configuration version history 225 includes a first configuration version, Version A 502a, and a second configuration version, Version B 502b. Each configuration version 502a, 502b, may include configuration metadata 222. Configuration metadata 222 may include a version identifier (ID) 507, a date 510, an updating user 514, and/or update notes 519.

The version ID 507 may be an alphanumeric identifier used to differentiate different versions and identify versions. Configuration versions 502a, 502b may be identified as part of a merge operation to merge specified configuration version 502a, 502b. Configuration version ID 507 may also be identified to select a current configuration version.

The date 510 may indicate the date and/or time that a particular configuration version 502a, 502b was created.

The updating user ID 514 indicates the identity and/or contact information of the user who created the configuration version 502a, 502b. The updating user 514 may be a name of the user, a user ID, an email address, or, an account name. Tenant credentials 128 may be used to track user identities as users access the computing system 110 and submit configuration change request 241.

Update notes 519 may be notes entered by the updating user to describe any changes in the instant configuration version 502a, 502b. This may developers in understanding more context about the reasoning about a particular configuration version 502a, 502b.

The configuration version 502a, 502b may also a configuration tree reference 523. The configuration tree reference 523 refers to or otherwise identifies a particular configuration tree 222. In some embodiments, the configuration tree 222 refers to or otherwise identifies configuration nodes 219 and how the configuration nodes are arranged within a hierarchy.

In some embodiments, a configuration version 502b may include a parent reference 545. The parent reference refers to or otherwise identifies a parent configuration version 502a. In the example of FIG. 5, Version A 502a is the parent of Version B 502b. When addressing a configuration change request 241, the configuration version being changed may be the parent configuration version 502a while the resulting configuration version is its child. This lineage data is stored in the configuration versions.

Figure 6A:
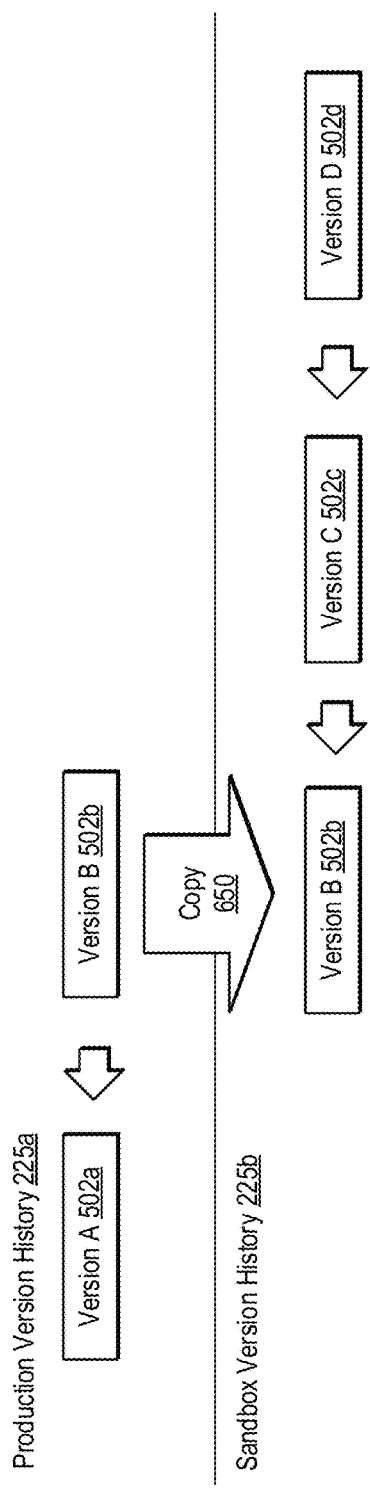
FIGS. 6A and 6B illustrate a fast forward merge process in the computing environment of FIG. 2, according to various embodiments of the present disclosure.
Figure 6B:
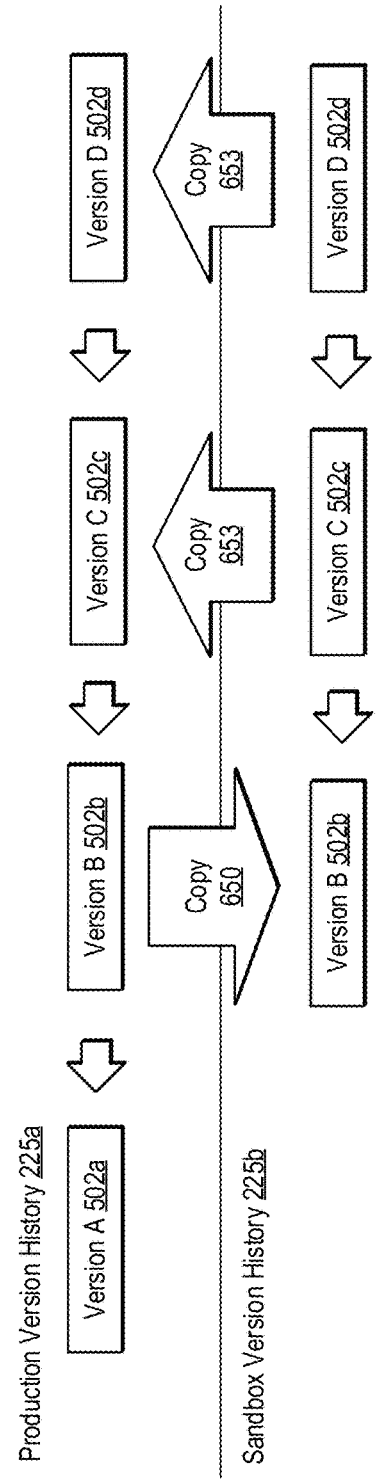

FIGS. 6A and 6B illustrate a fast forward merge process in the computing environment of FIG. 2, according to various embodiments of the present disclosure. FIGS. 6A and 6B show an example of a tenant who uses a software application as a production-level instance that is specific to the tenant and then creates a sandbox instance to develop or experiment with new configurations. As a result, a production-level configuration version history 225a is maintained to track various configuration versions made to the production-level instance. In addition, a sandbox configuration version history 225b is generated at or after the time the sandbox instance is created.

With respect to FIG. 6A, for the production-level instance, Version A 502a is a configuration version that was loaded and used in production. Eventually, Version A 502a is updated and modified to create Version B 502b. FIG. 6A shows an arrow pointing from Version B 502b to Version A 502a signifying that Version B 502b refers to Version A 502a as the parent version.

At this time, a user associated with the tenant wishes to develop a new configuration for the production-level instance. Loading new configurations into the production-level instance may be risky without first testing the configurations. For example, if the new configurations applied incorrect settings or were otherwise defective or erroneous, the tenant data 131 might not be properly processed. Therefore, a user may instantiate a sandbox instance of the production-level instance that is specific to the tenant. As a result, the production-level instance is cloned and executed in the sandbox.

The current configuration version at the time of creating the sandbox (e.g., Version B 502b) is copied using a copy operation 650 and added to the sandbox configuration version history 225b. In this respect, Version B 502b represents a portion of the production-level configuration version history 225a that is copied, as it is the current version used in the production-level instance. Here, users may modify Version B 502b after it has been copied in the sandbox without affecting the production-level instance. For example, as shown in FIG. 6A, a user modifies Version B 502b within the sandbox after it was copied. Version C 502c is created by applying changes to Version B 502b. Version C 502c may include a parent reference that refers to Version B 502b. A user may experiment with the sandbox instance with the configurations of Version C 502c applied without affecting the production-level instance. Changes made to Version C 502c may be recorded as a new version. For example, Version D 502d is created by making changes to Version C 502c. Throughout this process, the production-level instance did not have configurations that underwent any changes since the copying of Version B 502b.

FIG. 6B provides an example continuing from the example in FIG. 6A. Once a user is satisfied with the configuration changes, the user may then merge the changes made within the sandbox 118 to the production-level instance. For example, the user may submit a request to merge Version D 502d with the current version in the production-level instance, which is Version B 502b. This scenario may be referred to as a fast forward merge where Version B 502b is "fast forwarded" to be Version D 502d. In other words, because Version D 502d is a direct descendent of Version C 502c, the changes made in Version D 502d and intervening versions (e.g., Version C 502c) are applied to Version B 502b.

To perform this operation, the computing system 110 may perform an additional copy operation 650 to copy Version D 502d and intervening versions (e.g., Version C 502c) from the sandbox configuration version history 225b into the production-level configuration version history 225a. Once copied, the computing system 110 may determine that Version B 502b can be fast-forwarded to generate Version D 502d.

Figure 7A:
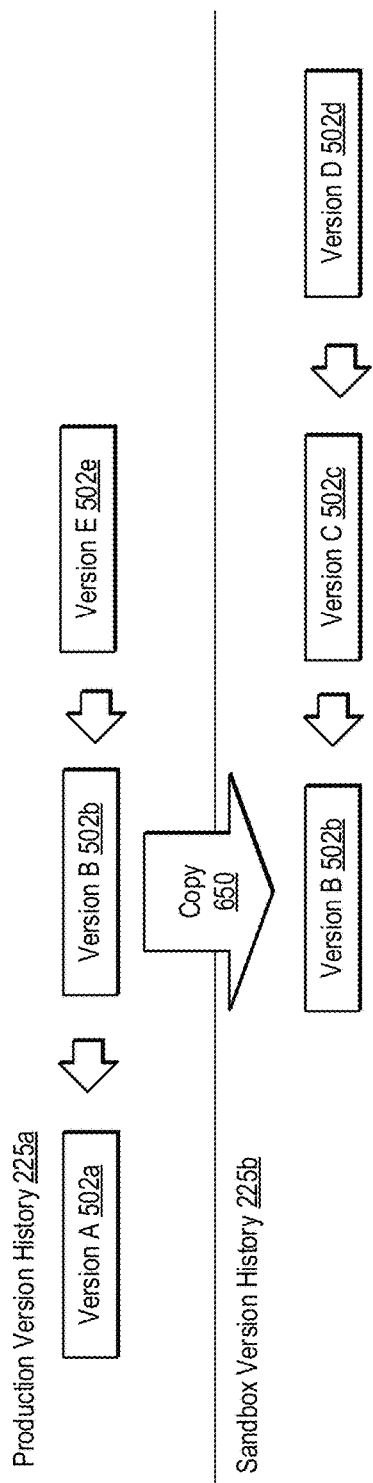
FIGS. 7A and 7B illustrate a three-way merge process in the computing environment of FIG. 2, according to various embodiments of the present disclosure.
Figure 7B:
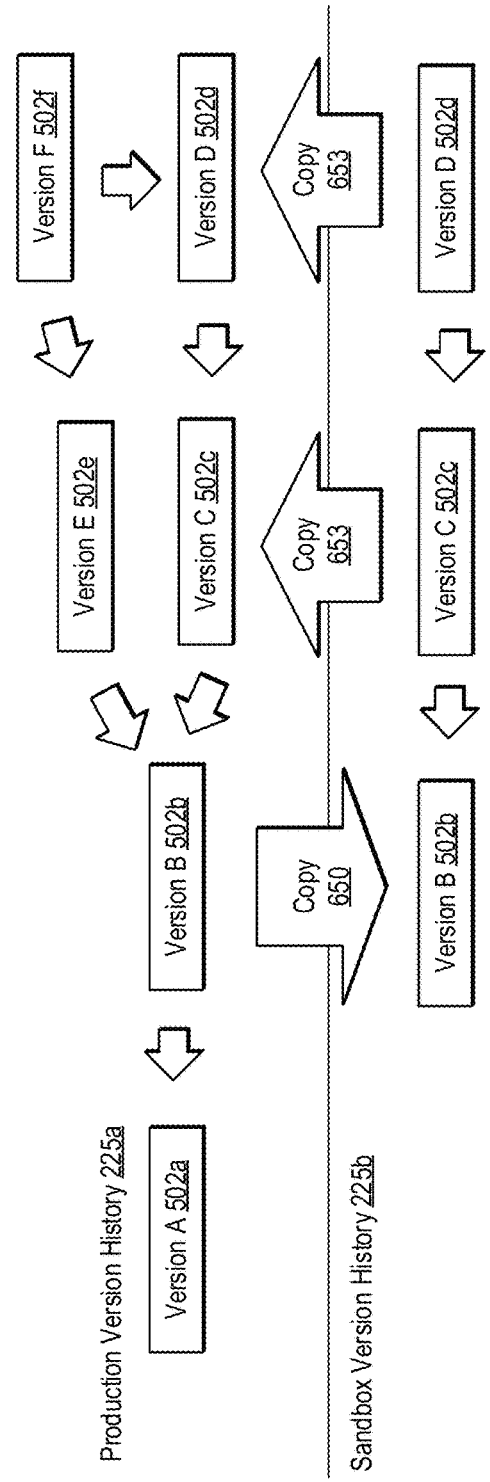

FIGS. 7A and 7B illustrate a three-way merge process in the computing environment of FIG. 2, according to various embodiments of the present disclosure. FIGS. 7A and 7B provide an example similar to the one shown in FIGS. 6A and 6B, but involve a more complex scenario where the production-level instance undergoes additional changes while a user makes changes within the sandbox. In other words, simultaneous changes are made to a common version in production and in the sandbox.

FIG. 7A is similar to FIG. 6A in that it begins with Version A 502a applied to the production-level instance for a tenant. Version A 502a is modified to generate Version B 502b within the production-level instance. A sandbox instance is executed and Version B 502b is copied and added to a parallel configuration version history 225b for the sandbox instance. Version B 502b is modified to generate Version C 502c. And Version C 502c is modified to generate Version D 502d. The user wishes to now merge Version D 502d, which was developed and tested in the sandbox, to production-level instance.

However, during the time Version D 502d was developed, the Version B 502b was modified to yield Version E 502e in production. In other words, Version B 502b is the parent of Version E 502e in the context of the production-level configuration version history 225a.

A fast forward merge would not apply in this case because Version E 502e disrupts the linear relationship between Version D 502d and Version B 502b. In this case, a three-way merge is applied. The three-way merge, in the example of FIGS. 7A and 7B involve Version B 502b, Version D 502d, and Version E 502e.

FIG. 7B provides an example continuing from the example in FIG. 7A. As shown in FIG. 7B, a user may operate in the sandbox 118 to generate an evolving configuration version that convert Version B 502b into Version C 502c and then into Version D 502d. Once a user is satisfied with the configuration changes, the user may then merge the changes made within the sandbox 118 to the production-level instance. For example, the user may submit a request to merge Version D 502d with the current version in the production-level instance, which is Version E 502e. This scenario may be referred to as a three-way merge where Version B 502b branches into Version E 502e and Version D 502d.

To perform this operation, the computing system 110 may perform a copy operation 653 to copy Version D 502d and intervening versions (e.g., Version C 502c) from the sandbox configuration version history 225b into the production-level configuration version history 225a. Once copied, the computing system 110 may determine that Version B 502b is a common version (e.g., common ancestor) with respect to Version D 502d and Version E for 502e.

To perform the three-way merge of configuration versions, the computing system 110 merges both the changes made in Version D 502d and Version E 502e into the common version, Version B 502b. This results in a merged version, Version F 502f. Merged version, Version F 502f, may refer to Version D 502d as the parent or Version E 502e, or both Version E 502e and Version D 502d. A validation check is made to determine if Version F 502f has any validation errors, and if so, whether those validation errors are conflicts. The merge process is discussed in greater detail with respect to FIGS. 8 and 9.

To briefly summarize the examples of FIGS. 6A, 6B, 7A, and 7B, these examples show the functionality of the configuration service 204 of a software application 117 that allows the creation of a version tracking in both the production-level instance and a sandbox instance of the software application 117. The version tracking is achieved, in part, by maintaining separate configuration version histories 225a, 225b. A current configuration version may be copied (e.g., pulled) into the configuration version history 225b of the sandbox instance, manipulated to created child configuration version, and then copied back (e.g., pushed) into the configuration version history 225a of the production-level instance. This may involve a merge operation if the configurations of the production-level instance were modified after the initial copy operation 650.

FIG. 8 is a flowchart illustrating an example of the functionality of a configuration service executed in the computing environment of FIG. 2 to implement configuration merging, according to various embodiments of the present disclosure. It is understood that the flowchart of FIG. 8 provides merely an example of the many different types of functional arrangements that may be employed to implement the operation of the portion of the software application as described herein. As an alternative, the flowchart of FIG. 8 may be viewed as depicting an example of elements of a method 800 implemented in the computing system 110 of FIG. 2, according to one or more embodiments.

At item 804, the computing system 110 receives a request to merge a target configuration version with a source configuration version. To illustrate, using the example of FIGS. 6A, 6B, 7A, and 7B after a user develops configuration Version D 502d in the sandbox 118, the user may submit a merge request to merge Version D 502d to the current configuration version that is recorded in the production-level configuration version history. In other words, the production-level configuration version history may be considered a first configuration version history, and the sandbox configuration version history may be considered a second configuration version history. The example in FIGS. 6A, 6B, 7A, and 7B, show the source configuration version being in the sandbox configuration version history (e.g., Version D 502d) and further show the target configuration version being the current configuration version in the production-level configuration version history.

In other embodiments, the source configuration version may be in the production-level configuration version history and the target configuration version may be in the sandbox configuration version history. Here, there may be a merge request to merge a production-level configuration with a configuration developed in the sandbox 118. In other embodiments, the target configuration version may be developed in a first sandbox instance while the source configuration version may be in a second sandbox instance.

At item 807, the computing system 110 identifies the source configuration version and the target configuration version. For example, the request to merge may include configuration version identifiers (e.g., version IDs 507) to identify different configuration versions. The source configuration version and/or the target configuration version may be the current configuration versions of their respective configuration version histories.

At item 811, the computing system 110 accesses one or more version histories to determine a common ancestor in the version lineage. For example, the computing system traces the lineage of the target version configuration and the source configuration version to determine whether a common version (e.g., common ancestor) exists. The computing system 110 may access the parent reference 545 or other identifiers to determine the lineage of each configuration version. In this respect, the common ancestor branched into configuration versions that led to the target version configuration and the source configuration version.

At item 815, the computing system 110 checks whether a common ancestor was identified. If not, then at 818, the computing system 110 generates an error notification. The error notification may indicate that there is no common ancestor. The error notification may be transmitted to the client device that submitted the request to merge.

If a common ancestor is identified, then, at item 821, the computing system 110 checks whether the common ancestor is the source configuration version. The example of FIGS. 6A and 6B address this scenario. For example, in the example of FIGS. 6A and 6B, the source configuration version is Version D 502d and the target configuration version is Version B 502b (e.g., the current configuration version in the production-level instance). In addition, the common ancestor is Version B 502b. Stated another way, the source configuration version is a direct descendent of the target configuration. If this is the case, then, at item 823, then it is confirmed that the target version contains of the source version. No additional processing is necessary to merge the target version with the source version.

At item 825, the computing system 110 checks whether the target configuration version is a direct ancestor (e.g., direct relative such as a parent, grandparent, etc.) to source configuration version. If so, then at item 826, the computing system 110 performs a fast forward merge where the target configuration version is fast forwarded to evolve into the source configuration version. If not, then at item 834 (described in FIG. 9), the computing system 110 applies a three-way merge.

In some embodiments, the computing system 110 copies the source configuration version and any parent configuration versions in its lineage into the configuration version history 225 of the target configuration version. Using the example, of FIGS. 6A and 6B, the source configuration version (e.g., Version D 502d) along with its parent configuration versions (e.g., Version C 502c) are copied into the configuration version history 225 of the target configuration version (e.g., the production-level configuration version history 225a). The computing system 110 performs a copy operation 653 to duplicate one or more configuration versions 502 and insert them into the intended configuration version history 225.

The computing system 110 may also set the source configuration version as the current configuration version. For example, a current version pointer 228 may be updated to point to the target configuration version. This scenario reflects a fast forward merge where the target configuration version is fast forwarded evolve into the source version, where it is then set as the current configuration version.

After the merged configuration version is stored and set as the current configuration version, the software application 117 may be configured according to this current configuration version. Here, tenant data 131 may be processed according to the current configuration version after setting the merged configuration version as the current configuration version.

Figure 9:
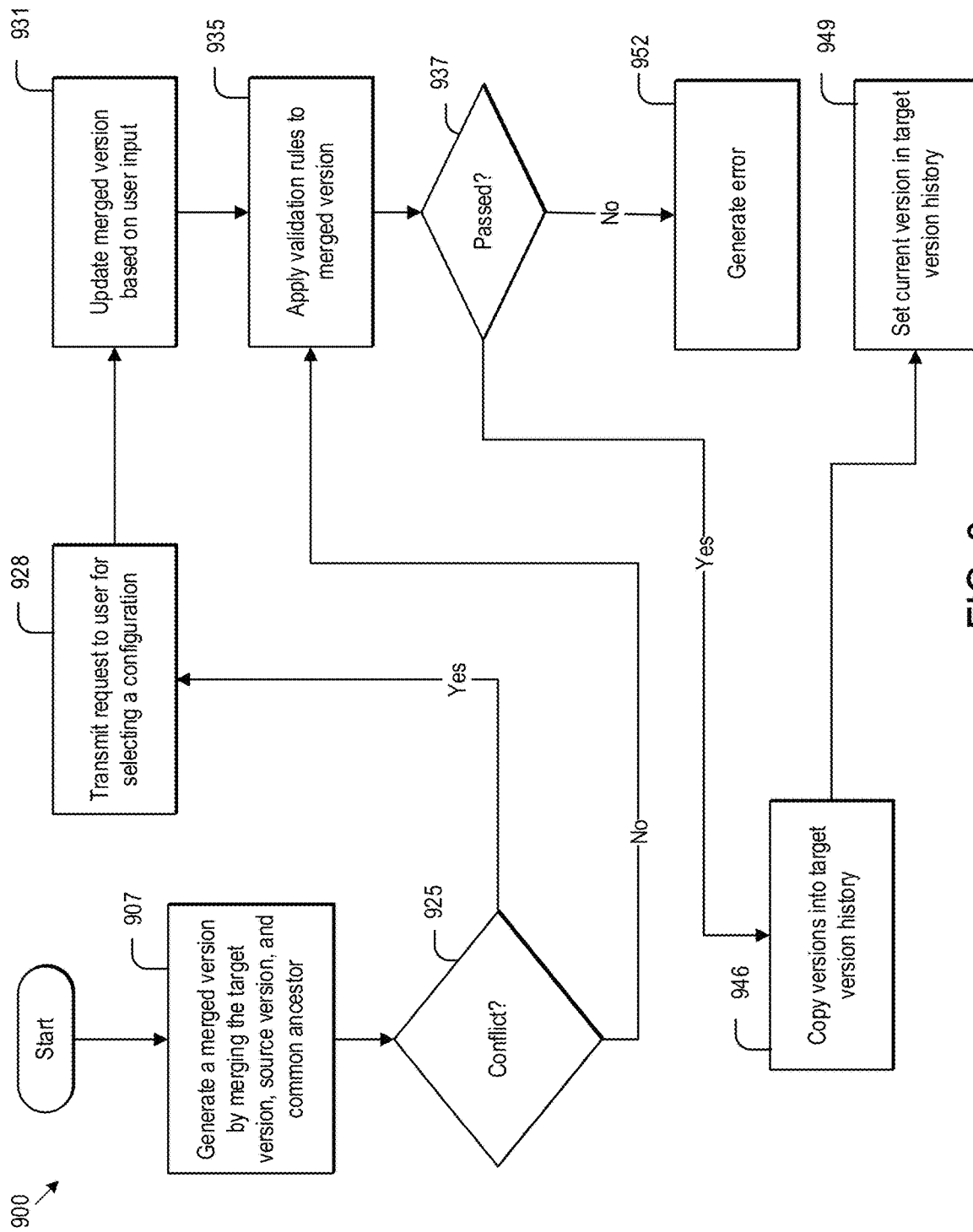
FIG. 9 is a flowchart illustrating an example of the functionality of a configuration service executed in the computing environment of FIG. 2 to implement a three-way merge, according to various embodiments of the present disclosure.

FIG. 9 is a flowchart illustrating an example of the functionality of a configuration service executed in the computing environment of FIG. 2 to implement a three-way merge, according to various embodiments of the present disclosure. It is understood that the flowchart of FIG. 9 provides merely an example of the many different types of functional arrangements that may be employed to implement the operation of the portion of the software application as described herein. As an alternative, the flowchart of FIG. 9 may be viewed as depicting an example of elements of a method 900 implemented in the computing system 110 of FIG. 2, according to one or more embodiments.

At item 907, the computing system 110 generates a merged configuration version by merging the target configuration version, source configuration version, and common ancestor version. For example, the computing system 110 may add any new configuration nodes 219 referenced by the target configuration version and source configuration version. Thus, the merged configuration version may include all configuration nodes referenced in either the target configuration version and source configuration version. If the target configuration version and source configuration version modify the same configuration node, all modifications may be applied to the configuration node to generate the merged configuration node. The configuration tree of the merged configuration version may encompass all changes made to the common ancestor as specified in both the target configuration version and the source configuration version.

At item 925, the computing system 110 determines whether there is a conflict within merged configuration version. A conflict may arise when multiple developers attempt to make a change to the same part of a configuration node and those changes have differing results. As an example, a change may be made in a production-level instance, where the change updates the name of a database table. This may result in a modification of a preexisting configuration node 219. While this change is being made, a change in the sandbox instance may be made, such that this change modifies the name to the database table to a different name. A conflict may arise because the same parameter (e.g., a database table name) is being modified by two different developers at the same time to be two different values.

If a conflict is detected, then, at item 928, the computing system 110 transmits a request to a user for selecting a configuration. The computing system 110 may identify a parameter, variable, attribute, or other configuration that is subject to the conflict based on the validation check. The computing system 110 may then identify the conflicting values and present the conflicting values to the user for selection. In this respect, the computing system 110 may attempt to resolve conflicts by soliciting user feedback. The request to select a configuration may be transmitted to the client device that transmitted the request to merge.

At item 931, the computing system 110 updates the merged configuration version based on user input. The user may transmit a configuration selection, which is then received by the computing system 110. The computing system 110 may select one of the conflicting conflict configurations and update the merged configuration version to resolve the conflict. The updated merged configuration version may then be copied into the relevant configuration version history and set to the current configuration version.

At item 935, the computing system 110 applies one or more validation rules to the merged configuration version. These operations may be similar to those described with respect to item 416 of FIG. 4.

At item 937, if the merged configuration version passed the validation check, then at item 946, the computing system copies the source configuration version (and potentially other related configuration versions) into the configuration version history that records the target configuration version. These operations may be similar to those described with respect to FIG. 8.

At item 949, the computing system 110 sets the current version in the target version history. For example, a current version pointer 228 may be updated to point to the merged configuration version.

If there merged configuration version did not pass the validation check, then the flowchart branches from item 937 to item 952. For example, if at least one validation rule is violated, then the merged configuration version does not pass the validation check. At item 952, the computing system 110 may generate an error and transmit the error to a predefined recipient.

In some embodiments, the merged configuration version may violate a configuration rule without having a conflict. For example, if the source configuration version modifies a database table name, as reflected in a configuration node 219 and the target version modifies a database query for the same database table, as reflected in the same configuration node, a validation error may be triggered because there are two simultaneous edits to the same configuration node. However, in this example, these changes do not result in a conflict, as both changes can coexist without resulting in a logical error.

Figure 10:
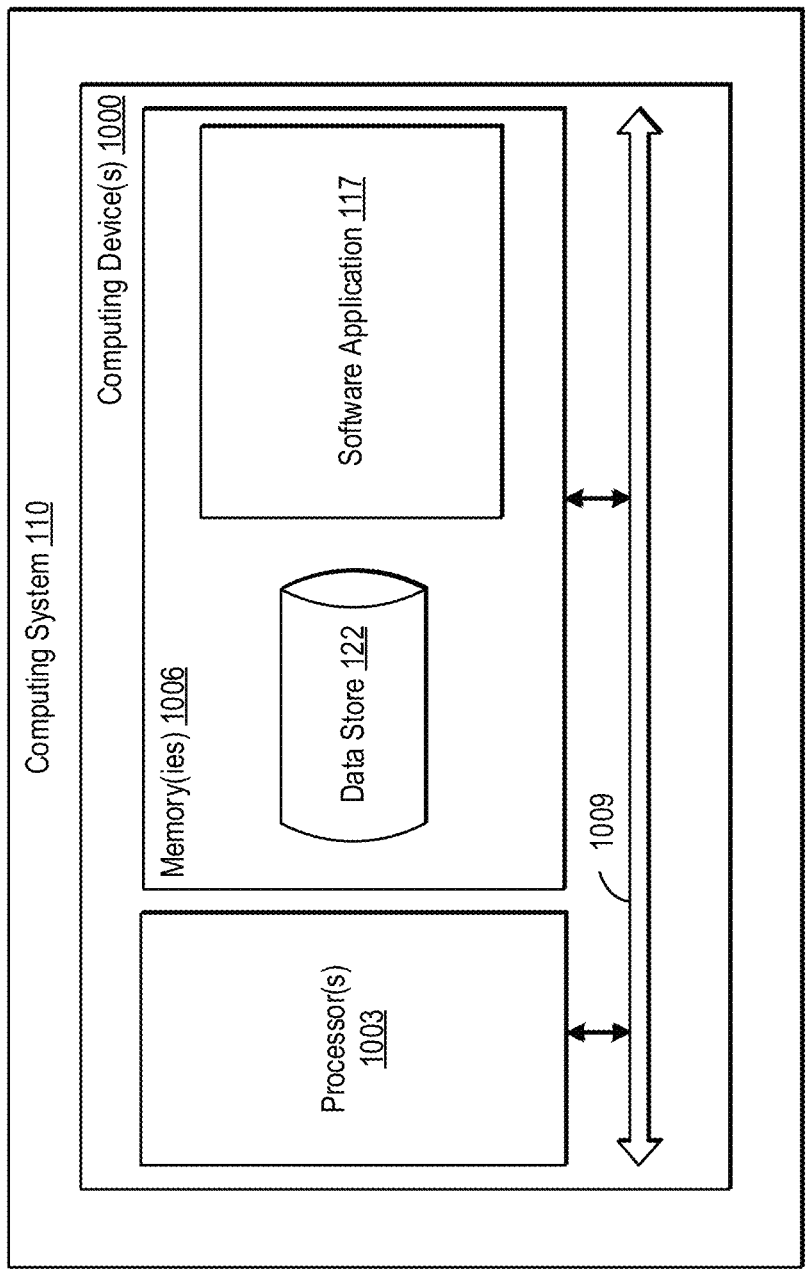
FIG. 10 is a schematic block diagram that provides one example illustration of a computing system of FIG. 2 according to various embodiments of the present disclosure.

FIG. 10 is a schematic block diagram that provides one example illustration of a computing system 110 of FIG. 1 according to various embodiments of the present disclosure. The computing system 110 includes one or more computing devices 1000. Each computing device 1000 includes at least one processor circuit, for example, having a processor 1003 and memory 1006, both of which are coupled to a local interface 1009 or bus. To this end, each computing device 1000 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 is the software application 117. The memory 1006 may store an operating system. The memory may include the data store 122.

It is understood that there may be other applications that are stored in the memory 1006 and are executable by the processor 1003 as can be appreciated. Where any component discussed herein is implemented in the form of software, any one of a number of programming languages may be employed, such as, for example, C, C++, C #, Objective C, Java®, JavaScript®, Perl, PHP, Visual Basic®, Python®, Ruby, Flash®, or other programming languages.

Several software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the software application 117 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts discussed above show the functionality and operation of an implementation of the software application 117. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 1003 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application 117 may also comprise software or code that can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 117, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 1000, or in multiple computing devices in the same computing system 110. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system comprising:
a server comprising a computing device including a processor executing a cloud-based software application and a sandbox instance of the software application, wherein the software application serves a plurality of tenants comprising a first tenant, and the sandbox instance serves only the first tenant; and
the sandbox instance of the software application is associated with the first tenant and a current configuration version, the sandbox instance configured to:
receive a configuration change request to change at least one setting of the software application executing in the sandbox instance;
generate a candidate configuration tree according to the configuration change request, the candidate configuration tree identifying changes between configuration changes in the configuration change request and the current configuration version used by the software application serving the plurality of tenants; and
writing the candidate configuration tree to a configuration data store storing configuration data causing a change in operation of the software application executing in the sandbox instance.

2. The system of claim 1, wherein the sandbox instance of the software application is configured to generate a new configuration node according to the configuration change request.

3. The system of claim 1, wherein the sandbox instance of the software application is configured to update a configuration node in a plurality of existing configuration nodes according to the configuration change request.

4. The system of claim 1, wherein the sandbox instance of the software application is configured to load a current configuration tree and generate the candidate configuration tree by applying a change identified in the configuration change request to the current configuration tree.

5. The system of claim 1, wherein the configuration data comprises a configuration version history, the configuration version history organized as a plurality of configuration versions, the configuration version history specifying a single, current configuration version.

6. The system of claim 5, wherein each configuration version references a respective configuration tree among a plurality of configuration trees.

7. The system of claim 5, wherein each configuration version comprises configuration metadata, the configuration metadata comprising a user identifier and a date of creation.

8. The system of claim 5, wherein at least one configuration version references a parent configuration version.

9. The system of claim 5, wherein the sandbox instance of the software application is configured to:
update the configuration version history to include a new configuration version, the new configuration version referencing the candidate configuration tree; and
set the new configuration version as the current configuration version.

10. The system of claim 9, wherein updating the configuration version history comprising performing one of a fast forward merge or three-way merge.

11. A method comprising:
executing a cloud-based software application on a server, a portion of the software application being allocated to a first tenant;
executing a sandbox instance by cloning the portion of the software application, the sandbox instance associated with the first tenant and a current configuration version, and the sandbox instance serving only the first tenant;

receiving a configuration change request to change at least one setting of the software application executing in the sandbox instance;

generating a candidate configuration tree according to the configuration change request, the candidate configuration tree identifying changes between configuration changes in the configuration change request and the current configuration version used by the software application serving the plurality of tenants; and writing the candidate configuration tree to a configuration data store storing configuration data causing a change in operation of the software application executing in the sandbox instance.

12. The method of claim 11, further comprising generating a new configuration node according to the configuration change request.

13. The method of claim 11, further comprising updating a configuration node in a plurality of configuration nodes according to the configuration change request.

14. The method of claim 11, further comprising, loading, by the sandbox instance, a current configuration tree and generating, by the sandbox instance, the candidate configuration tree by applying a change identified in the configuration change request to the current configuration tree.

15. The method of claim 11, wherein the configuration data comprises a configuration version history, the configuration version history organized as a plurality of configuration versions, the configuration version history specifying a single, current configuration version.

16. The method of claim 15, wherein each configuration version references a respective configuration tree among a plurality of configuration trees.

17. The method of claim 15, wherein each configuration version comprises configuration metadata, the configuration metadata comprising a user identifier and a date of creation.

18. The method of claim 15, wherein at least one configuration version references a parent configuration version.

19. The method of claim 15, updating the configuration version history to include a new configuration version, the new configuration version referencing the candidate configuration tree; and setting the new configuration version as the current configuration version.

20. A non-transitory computer-readable storage medium for tangibly storing computer program instructions capable of being executed by a computer processor, the computer program instructions defining steps of:

executing a cloud-based software application on a server, a portion of the software application being allocated to a first tenant;

executing a sandbox instance by cloning the portion of the software application, the sandbox instance associated with the first tenant and a current configuration version, and the sandbox instance serving only the first tenant;

receiving a configuration change request to change at least one setting of the software application executing in the sandbox instance;

generating a candidate configuration tree according to the configuration change request, the candidate configuration tree identifying changes between configuration changes in the configuration change request and the current configuration version used by the software application serving the plurality of tenants; and writing the candidate configuration tree to a configuration data store causing a change in operation of the software application executing in the sandbox instance.

* * * * *